Figure 1:
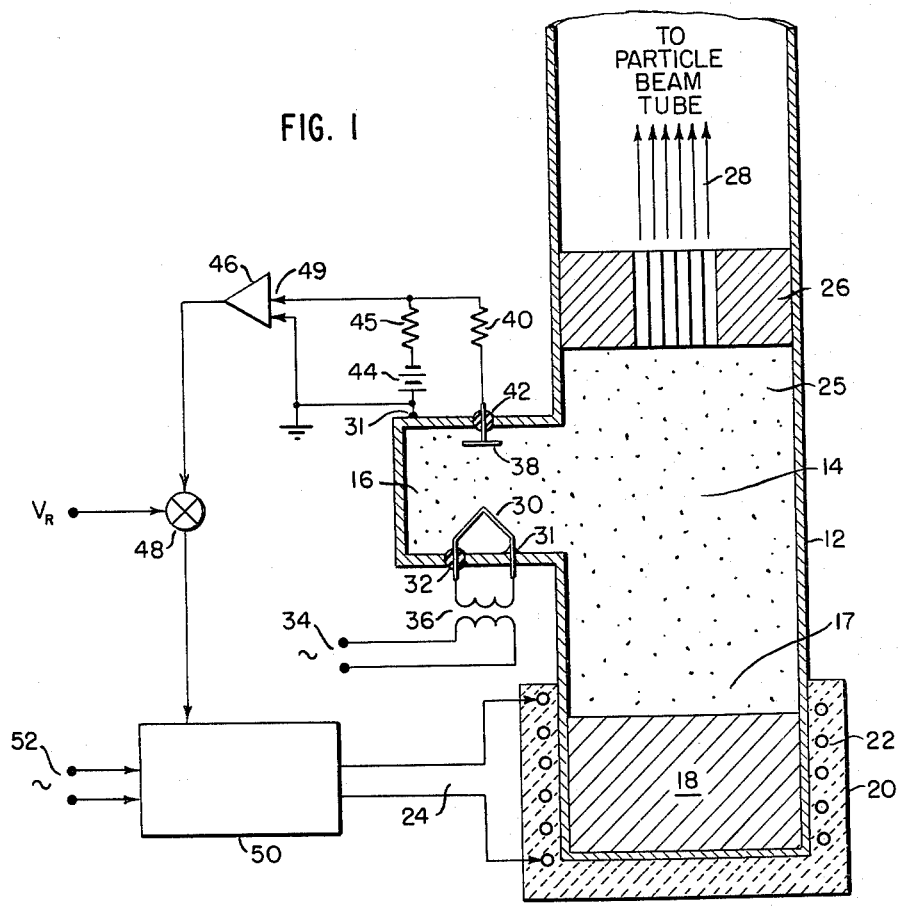

Oct. 17, 1961  J. GEORGE  3,005,121
BEAM INTENSITY CONTROL SYSTEM
Filed Sept. 14, 1959

INVENTOR.
JAMES GEORGE
BY Kenway, Jenney,
Witter + Hildreth
ATTORNEYS

United States Patent Office 3,005,121
Patented Oct. 17, 1961

3,005,121
BEAM INTENSITY CONTROL SYSTEM
James George, Swampscott, Mass., assignor to National Company, Inc., Malden, Mass., a corporation of Massachusetts
Filed Sept. 14, 1959, Ser. No. 839,790
5 Claims. (Cl. 313—63)

This invention relates in general to a beam intensity control system, particularly a system for controlling the intensity of a beam of atomic or molecular gas particles.

Such beams may be used, for example, in beam tubes in connection with a nuclear resonance frequency standard. The atoms or molecules of the gas which is collimated to make up the beam, are generally obtained by effusion upon the application of heat to a suitable source material which is located in an evacuated chamber. The effusion rate within the chamber is regulated by controlling the application of heat from a source material. Upon passing through a beam collimator which communicates with the outside, the gas particles leave the chamber in beam form.

In presently available control systems a secondary temperature sensing element is usually located within the chamber. The application of heat to the source material is controlled by the temperature-sensitive element, which may be a thermostat, or which may be incorporated as one arm of a resistance bridge. The operation of such a system relies on the physical principle that the rate of effusion of gas particles from the source material, and hence the beam intensity, is a function of the temperature of the source material.

The disadvantage of this control technique stems from its dependence on the fixed geometric parameters of the beam source. It is further dependent on the thermodynamic properties of the beam source material which may be solid, liquid or gaseous in form. As a consequence, the beam intensity is not a linear function of the temperature detected by the termperature-sensitive element, nor is the relationship constant over a given temperature range. Additionally, the change in beam intensity for a given change in temperature is different for different source materials and varies even for different states of the same source material. As a result, presently available control systems are incapable of maintaining the intensity of a gas particle beam within narrowly defined limits without elaborate compensation schemes which greatly increase the complexity of the system.

Figure 2:
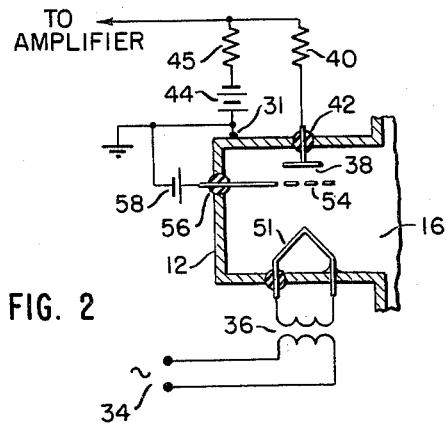

It is the primary object of this invention to provide a relatively simple particle beam intensity control system which overcomes the foregoing disadvantages and which permits the control of beam intensity within narrowly defined limits. This and other objects of the invention together with the features and advantages thereof will become apparent from the following specification, when read in connection with the accompanying drawings in which:

FIG. 1 illustrates in schematic form a preferred embodiment of the invention; and FIG. 2 illustrates a modification of the ionization means shown in FIG. 1.

If we disregard the constant effect of the beam collimator which communicates between the effusion chamber and the outside, the intensity of the particle beam which passes through the collimator is a function of the density of the atomic or molecular gas particles within the chamber. This function remains constant regardless of the source material used or of its state. The invention herein takes advantage of this constant relationship by regulating the application of heat to the source material in accordance with the particle density within the chamber. A portion of the particles in the chamber is continuously ionized so that the resultant ion current serves as a measure of the particle density. The ion current, in turn, is used to control the application of heat to the source material.

With reference now to FIG. 1 which illustrates a preferred embodiment of my invention, an envelope 12 encloses a main chamber 14 and an auxiliary chamber 16 which communicates with the main chamber. One end portion of the main chamber 14 forms a container 17 for holding a source material 18 which may be solid, liquid or gaseous in form. The source material used in the apparatus illustrated herein is alkaline in nature and may consist, for example, of cesium, potassium or rubidium, or compounds, thereof, adapted to produce gas particles which are atomic or molecular in form. The ionization potential of each of these elements is smaller than the work function potential of the metallic hot wire cathode 30 in the ionization chamber 16. This is important to the operation of the apparatus, as will be explained in greater detail hereinafter. Heat is applied to the source material in the container 17 by means of a heater 20. The heater preferably consists of a heavy wire heating coil 22, which is energized from a pair of cables 24. The opposite end 25 of the main chamber is terminated by a beam collimator 26. The collimator passes the randomly moving gas particles derived from the source material in the form of a particle beam 28 for further use in the beam tube.

The hot wire cathode 30 of the ionizing device preferably has the shape of a filament ribbon and is positioned in the auxiliary chamber 16. One side of the cathode communicates with the outside of the chamber through a suitable glass seal 32, while the other side of the cathode is tied to the envelope 12, which may be grounded as shown at 31. The hot wire cathode is energized from a source 34, e.g. the line, through a suitable transformer 36. An ion collector 38 is spaced from the cathode 30 within the auxiliary chamber. A resistor 40 connects the ion collector to one input terminal 49 of an amplifier 46 through a suitable metal to glass seal 42. The other amplifier input terminal is grounded. A D.C. source 44 is connected in series with a resistor 45, between the input terminal 49 and the grounded envelope. This connection serves to apply a negative potential to the ion collector through the resistor 40. The output of the amplifier 46 is coupled to a conventional comparison circuit 48. The comparison circuit receives a second input signal from a reference voltage source $V_R$, which signal is preferably adjustable. The output of the comparison circuit 48 is applied to the control portion of a power supply 50 which is energized from a suitable source 52, e.g. the line. The output of the power supply 50 is connected to the aforesaid cables 24 which serve to energize the wire coil 22.

In operation, the envelope 12 is evacuated by suitable pumping means, not shown, and is sealed. The current in heating coil 22 causes heat to be applied to the source material 18. As a result, gas particles effuse from the source material and are dispersed throughout the main and auxiliary chambers. The gas particles are, in all cases, molecular in form although, where particles of a single element are effused, they may be atomic in form. It will be understood that the form of the gas particles depends, in all cases, on the nature of the source material. The particles effuse out of the main chamber through the collimator, whence they reach the particle been tube in beam form.

Some of the gas particles which reach the auxiliary chamber 16 impinge on the heated ribbon filament of the cathode whose temperature is maintained at approximately 2000° K. The rate at which the gas particles impinge on the filament 30 obeys the following relationship:

$$N = \frac{n\bar{v}A}{4}$$

where:

$N$ = atoms per second striking the hot wire cathode 30,
$n$ = gas density in atoms per cm.$^3$,
$\bar{v}$ = atom velocity,
$A$ = the area of the hot wire cathode 30.

The foregoing equation applies to the case where gas particles in atomic form effuse from the source material upon the application of heat. For gas particles in molecular form the applicable constants of the equation will of course be different.

Each gas particle which impinges on the hot wire cathode 30 gives up one electron to form a positively charged ion. This operation results from the fact that the ionization potential of the source materials, i.e. cesium, potassium or rubidium (or compounds thereof), is smaller than the work function potential of the meter which forms the hot wire filament. The number of ions formed on the hot wire filament is determined by the following relationship:

$$N_1 = k_1 N$$

where:

$N_1$ = number of ions formed,
$k_1$ = a constant determined by the hot wire temperature and the hot wire material,
$N$ = atoms per second striking the hot wire cathode.

The positively charged ions are attracted to the ion collector which is maintained at approximately $-100$ volts with respect to the cathode. The current formed by the collected ions is given by the following relationship:

$$N_2 \times 1.6 \times 10^{-19} \text{ amperes} = k_2 N_1$$

where:

$N_2$ = number of ions collected by the ion collector,
$k_2$ = a constant determined by the internal electrode leakage resistance, the ion collector area and gas scatter,
$N_1$ = number of ions formed on the hot wire cathode.

The ion current is carried by resistors 40 and 45. The voltage which appears across resistor 40 is applied to the amplifier 46 and develops a voltage at its output which is proportional to the number of ions collected. This voltage is nulled with a reference voltage $V_R$ in the comparison circuit 48. The reference voltage is preferably adjustable in order to permit a variation of the intensity of the particle beam which effuses through the collimator. Depending on the polarity of the resultant comparison output signal, the output current of power supply 50 either increases or decreases to raise or lower respectively, the temperature of the source material. As a result, gas particles effuse at a greater or lesser rate from the source material. This process continues until the amplified ion current develops a voltage which is exactly equal to the reference voltage $V_R$. At that point, the comparison output signal is zero and the current supplied by power supply 50 remains constant.

FIG. 2 illustrates a modification of the apparatus of FIG. 1, applicable reference numerals having been carried forward. This modification of the invention is applicable where the source material consists of alkaline elements such as sodium or lithium, or compounds thereof, or other materials having an ionization potential which is greater than the work function potential of the metallic hot wire cathode 30. As a consequence, contact of the gas particles with the hot wire cathode does not automatically result in ionization and it becomes necessary to bombard the gas particles with electrons to bring about this effect. A grid 54 is positioned between the cathode 51 and the ion collector 38, in close proximity to the ion collector. The cathode 51 is coated with a suitable material which releases electrons upon being heated. A positive potential, which is derived from a D.C. source 58, is applied to the grid 54 by way of a conductive connection through a suitable envelope seal 56. The electrons which are released from the cathode 51 are attracted toward grid 54 by the positive potential thereon. The electrons which pass through the grid strike the gas particles in the space between the grid and the ion collector 38. The gas particles so bombarded ionize by releasing electrons. The ionized gas particles are attracted by the negative potential on the ion collector and form an ion current in the manner explained in connection with FIG. 1.

The control system which forms the subject matter of the invention herein is capable of regulating the effusion rate of gas particles to an accuracy of the order of 0.1 percent. The intensity of the resultant ion beam is maintained constant within correspondingly narrow limits. As a consequence, the control system herein is applicable to beam sources where the gas density as a function of temperature has a very steep slope, i.e.

$$\frac{dp}{dt} \gg 1$$

where:

$p$ is gas density, and
$t$ is the temperature in degree Kelvin.

Such a condition occurs where the source material is in the solid state and the gas particles are effused as a result of thermal decomposition.

In the control system disclosed herein the gas density is continuously monitored and is maintained at a constant operating value. The resultant beam intensity control is considerably improved over that of prior systems wherein the source temperature alone is monitored to exert a secondary control effect on the beam intensity. In such systems, the temperature is maintained constant to provide a constant particle effusion rate from the source material. In contradistinction, the result of maintaining the gas density constant in the instant control system is to hold constant the rate at which gas particles pass through the collimator. This is carried out independently of the effusion rate of the gas particles from the source material, the latter, particularly in solid state source materials, being subject to change with temperature and time.

A further advantage of the invention herein resides in the fact that the rate of generating gas particles from a chemically reacting source is more accurately controlled by a gas density monitor than by a temperature monitor. This is due to the fact that the temperature point at which effusion takes place is not clearly defined since the reaction rate constitutes an exponential function when plotted against temperature.

The preferred embodiments of the invention which are disclosed herein are intended to be illustrative only. It will be obvious that numerous modifications, departures and equivalents will now occur to those skilled in the art, all of which fall within the true spirit and scope of this invention.

I claim:

1. Apparatus for producing a constant-intensity beam of gas particles for use in a molecular resonance frequency standard comprising, an evacuated envelope consisting of a main chamber and a communicating auxiliary chamber, means disposed in said main chamber adapted to hold the source material for said particles, means external to said envelope for heating said source material to produce particles thereof by effusion, a beam collimator disposed in said main chamber opposite said holding means, said beam collimator communicating with the outside of said main chamber, means disposed in said auxiliary chamber for ionizing said gas particles, means spaced from said ionizing means for collecting said ionized gas particles to form an ion current, and means responsive to said ion current for controlling said heating means, said ionizing means comprising a cathode, means for heating said cathode from outside said envelope, a grid spaced from said cathode, means for applying a positive potential to said grid with respect to said cathode, and said ion collecting means comprising an electrode shielded from said cathode by said grid, and means for applying a negative potential to said ion collecting electrode with respect to said cathode.

2. Apparatus for producing a constant-intensity beam of gas particles from a source material for use in a particle beam tube comprising, an evacuated envelope consisting of a main chamber and a communicating auxiliary chamber housed in a common envelope, one end of said main chamber being adapted to hold said source material, an electrical heating device surrounding said envelope near said one end, means for passing a heating current through said device, said device being adapted to heat said source material to effuse gas particles therefrom, a beam collimator disposed at the opposite end of said main chamber, said beam collimator being adapted to pass said gas particles in beam form to the outside of said envelope, means disposed in said auxiliary chamber for ionizing said gas particles, means spaced from said ionizing means within said auxiliary chamber for collecting said ionized gas particles to form an ion current, said ion collecting means being adapted to conduct said ion current to the outside of said envelope, means for amplifying said ion current adapted to derive a proportional output voltage, means for comparing said output voltage with a predetermined reference voltage, and means responsive to said comparison for controlling said heating current.

3. The apparatus of claim 2 wherein said ionizing means comprise a cathode, means for heating said cathode from outside said envelope, said ion collecting means comprising an electrode, and means for applying a negative potential to said ion collecting electrode with respect to said cathode.

4. The apparatus of claim 2 wherein said ionizing means comprise a cathode, means for heating said cathode from outside said envelope, a grid spaced from said cathode, means for applying a positive potential to said grid with respect to said cathode, said ion collecting means comprising an electrode shielded from said cathode by said grid, and means for applying a negative potential to said ion collecting electrode with respect to said cathode.

5. The apparatus of claim 3 wherein said source material consists of a material including cesium.

References Cited in the file of this patent

UNITED STATES PATENTS

| | | |
|---|---|---|
| 2,457,530 | Coggeshall | Dec. 28, 1948 |
| 2,715,186 | Hull | Aug. 9, 1955 |